United States Patent

Montagna et al.

[11] Patent Number: 5,602,225
[45] Date of Patent: Feb. 11, 1997

[54] PROCESS FOR IMPARTING OIL- AND WATER-REPELLENCY TO TEXTILE FIBRES, SKIN, LEATHER AND THE LIKE

[75] Inventors: Laura Montagna, Arese; Mauro Scapin, Busto Arsizio; Padmanabhan Srinivasan, Milan, all of Italy

[73] Assignee: Ausimont S.p.A., Milan, Italy

[21] Appl. No.: 542,918

[22] Filed: Oct. 13, 1995

[30] Foreign Application Priority Data

Oct. 13, 1994 [IT] Italy .................................. MI94A2086

[51] Int. Cl.$^6$ ..................................................... C08G 77/04
[52] U.S. Cl. .............................. 528/25; 528/42; 427/387; 106/287.13; 106/287.14; 106/287.16
[58] Field of Search ........................ 528/42, 25; 427/387; 106/287.13, 287.14, 287.16

[56] References Cited

U.S. PATENT DOCUMENTS

| | | | |
|---|---|---|---|
| 3,818,074 | 6/1974 | Ahlbrecht | 260/486 |
| 4,094,911 | 6/1978 | Mitsch et al. . | |
| 4,426,476 | 1/1984 | Chang | 524/288 |
| 4,746,550 | 5/1988 | Strepparola et al. . | |
| 4,818,619 | 4/1989 | Stepparola et al. . | |

FOREIGN PATENT DOCUMENTS

| | | |
|---|---|---|
| 75865 | 6/1993 | European Pat. Off. . |
| 603697 | 6/1994 | European Pat. Off. . |
| 0603697A1 | 6/1994 | European Pat. Off. . |
| 624680 | 11/1994 | European Pat. Off. . |

OTHER PUBLICATIONS

Encyclopedia of Polymer Science and Engineering, vol. 15, Wiley–Interscience Publishers, NY, 1989, pp. 204 and 211.

*Primary Examiner*—Melvyn I. Marquis
*Attorney, Agent, or Firm*—Watson Cole Stevens Davis P.L.L.C.

[57] ABSTRACT

A process is described for imparting oil- and water-repellency to textile fibers, skin, leather and the like, wherein a composition comprising a functionalized (per)fluoropolyoxyalkylene with silane groups and a phosphoric monoester derived from a (per)fluoropolyoxyalkylene is applied on said materials. As dispersing agent, an hydrophilic organic solvent (for instance an alcohol), optionally in admixture with water can be used. Limpid, stable and easily dilutable formulations are thus obtained, which are capable of imparting very good properties both of oil- and water-repellency. Such properties keep for a long time also after washing both in water by means of detergents and by dry cleaning with organic solvents.

15 Claims, No Drawings

PROCESS FOR IMPARTING OIL- AND WATER-REPELLENCY TO TEXTILE FIBRES, SKIN, LEATHER AND THE LIKE

The present invention relates to a process for imparting oil- and water-repellency to textile fibers, skin, leather and the like, by using a composition based on functionalized (per)fluoropolyoxyalkylenes.

It is known the use of formulations based on silicones and silanes for the treatment of fabrics which confer to the substrate satisfactory properties of water-repellency and a good softness (the so called "coat"). Such products, however, do not exert any oil-repellency effect.

Formulations for the treatment of fibrous materials based on fluorinated products are also known, which allow to obtain both oil- and water-repellency properties. See for example compositions comprising fluoropolyacrylates in U.S. Pat. Nos. 3,818,074 and 4,426,476. Said products are essentially filming polymers wherein the fluorinated component is not able to give stable bonds with the substrate, wherefore they are scarcely resistant to washings, and in particular to dry cleanings with chlorinated organic solvents. Moreover, owing to the poor adhesion to fibers, the applied products can be easily removed under a mechanical action of friction and/or pressure.

The Applicant has now surprisingly found that it is possible to impart to textile fibers, skin, leather and the like, high oil- and water-repellency properties, which substantially remain unchanged even after washing both in water with detergents and by dry cleaning, by applying on said substrates a composition comprising a functionalized (per)fluoropolyoxyalkylene with silane groups and a phosphoric monoester derived from a (per)fluoropolyoxyalkylene, the structures of which are defined hereinunder.

An object therefore of the present invention is a process for imparting oil- and water-repellency to textile fibers, skin, leather and the like, which comprises applying on said substrates a composition comprising a functionalized (per)fluoropolyoxyalkylene with silane groups having the formula:

$$R_f\text{—O—CFY—L—Si}(R_1)_\alpha(OR_2)_{3-\alpha} \qquad (I)$$

wherein:
$R_f$ is a (per)fluoropolyoxyalkylene chain; Y is —F or —CF$_3$; L is a divalent organic group; $R_1$ and $R_2$, equal to or different from each other, are seleted from $C_1$-$C_6$ alkyls, optionally containing one or more ether bridges, $C_6$-$C_{10}$ aryls, alkylaryls or arylalkyls $C_7$-$C_{12}$; $\alpha$ is an integer from 0 to 2, preferably it is zero or 1;
and a phosphoric monoester having formula:

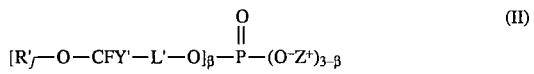

wherein:
$R'_f$ is a (per)fluoropolyoxyalkylene chain; Y' is —F or —CF$_3$; L' is a divalent organic group; β=1, Z$^+$ is selected from: H$^+$, M$^+$ wherein M is an alkaline metal, N(R$_3$)$_4^+$ wherein the R$_3$ groups, equal to or different from each other, are H or C$_1$-C$_6$ alkyls.

A further object of the present invention resides in compositions comprising the silane derivative of formula (I) and the phosphoric monoester of formula (II) as defined above.

The silane derivatives of formula (I) are known products, and can be prepared, e.g., according to U.S. Pat. Nos. 4,094,911, 4,746,550 and 4,818,619.

The phosphoric monoesters of formula (II) are known products; the preparation and the use thereof for the surface treatment of porous ceramic materials are described in EP application 603,697.

In the formulas (I) and (II) the L and L' groups, equal or different from each other, are divalent, preferably non fluorinated, organic groups. In particular the L group can be selected, for instance, from:

(a) —CH$_2$—(OCH$_2$CHR$_4$)$_n$—, wherein: n is an integer from 0 to 3; R$_4$ is —H or —CH$_3$;

(b) —CO—NR$_5$R$_6$—, wherein R$_5$ is H or a C$_1$-C$_4$ alkyl; R$_6$ is a C$_1$-C$_8$ alkylene, or a —(CH$_2$)$_p$NH(CH$_2$)$_q$— group wherein p, q are integers from 1 to 4.

The L' group can be selected, for intance, from:

a) —CH$_2$—(OCH$_2$CHR$_7$)$_n$—, wherein: n has the above meaning, R$_7$ is —H or —CH$_3$;

b') —CO—NR$_8$R$_9$—, wherein R$_8$ is H or a C$_1$-C$_4$ alkyl; R$_9$ is a C$_1$-C$_8$ alkylene.

The (per)fluoropolyoxyalkylenic chains $R_f$ and $R'_f$, equal to or different from each other, have preferably a number average molecular weight $\overline{M}_n$ from 350 to 3,000, more preferably from 400 to 1,000 and are formed by one or more repetitive units, statistically distributed along the chain, selected from:
(C$_3$F$_6$O); (C$_2$F$_4$O); (CFYO), wherein Y is –F or –CF$_3$;
(CXZ—CF$_2$CF$_2$O), wherein X and Z, equal or different from each other, are F, Cl or H.

The $R_f$ and $R'_f$ chains can be selected in particular from the following classes:

$$\text{(a) } T\text{—O—}(CF_2CF(CF_3)O)_{m'}(CFYO)_{n'}\text{—CFZ}^0\text{—} \qquad (III)$$

wherein:
T is a (per)fluoroalkylic group selected from:
—CF$_3$, —C$_2$F$_5$, —C$_3$F$_7$, —CF$_2$Cl, —C$_2$F$_4$Cl, —C$_3$F$_6$Cl;
Y is —F or —CF$_3$; Z$^0$ is —F, —Cl or —CF$_3$; m' and n' are such numbers that the n'/m' ratio is comprised between 0.01 and 0.5 and the number avarage molecular weight $\overline{M}_n$ is comprised in the range indicated above;

$$\text{(b) } T'\text{—O—}(CF_2CF_2O)_{p^2}(CF_2O)_{q^2}\text{—CFZ}'\text{—} \qquad (IV)$$

wherein:
T' is a (per)fluoroalkylic group selected from:
—CF$_3$, —C$_2$F$_5$, —CF$_2$Cl, —C$_2$F$_4$Cl; Z' is —F or —Cl; p$^2$ and q$^2$ are such numbers that the q$^2$/p$^2$ ratio is comprised between 0.5 and 2 and the molecular weight is comprised in the range indicated above;

$$\text{(c) } T''\text{—O—}(CF_2CF(CF_3)O)_r\text{—}(CF_2CF_2O)_s\text{—}(CFX''O)_t\text{—CFZ}''\text{—} \qquad (V)$$

wherein:
T'' is a (per)fluoroalkylic group selected from:
—CF$_3$, —C$_2$F$_5$, —C$_3$F$_7$, —CF$_2$Cl, —C$_2$F$_4$Cl, —C$_3$F$_6$Cl; X'' is —F or —CF$_3$; Z$^0$ is —F, —Cl or —CF$_3$; r, s and t are integers such that r+s is comprised between 1 and 50, the t/(r+s) ratio is comprised between 0.01 and 0.05 and the molecular weight is comprised in the range indicated above;

(d) $T'''$—O—(CF(CF$_3$)CF$_2$O)$_u$—CF(CF$_3$)— wherein: $T'''$ is —C$_2$F$_5$ or —C$_3$F$_7$; u is an integer such that the molecular weight comprised in the range indicated above;

$$\text{(e) } T^{IV}\text{—O—}(CY^{IV}Z^{IV}\text{—}CF_2CF_2O)_v\text{—}CY^{IV}Z^{IV}\text{—CF}_2\text{—} \qquad (VII)$$

wherein:
$Y^{IV}$ and $Z^{IV}$, equal to or different from each other, are F, Cl or H; $T^{IV}$ is —CF$_3$, —C$_2$F$_5$ or —C$_3$F$_7$; v is a number such that the molecular weight is comprised in the range indicated above;

f) $T^v$—O—$(CF_2CF_2O)_{w\text{-}CF2}$— wherein: p1 $T^v$ is —$CF_3$ or —$C_2F_5$; w is a number such that the molecular weight is comprised in the range indicated above;

As described in the mentioned EP application 603,697, the phosphoric monoester of formula (II) can be optionally mixed with a phosphoric diester, corresponding to the formula (II) with β=2, and/or a phosphoric triester corresponding to the formula (II) with β=3, in such amounts that the content of monoester is at least equal to 80% by moles. The phosphoric monoester of formula (II) can be utilized both in acid form ($Z^+=H^+$), and salified with an hydroxide of an alkaline metal ($Z^+=M^+$, with M=Li, Na, K, etc.) or with ammonia or with an amine ($Z^+=N(R_3)_4^+$). The R groups can be optionally substituted with hydroxyls or can be linked each other so as to form a ring on the nitrogen atom, for instance of morpholinic type.

As dispersant for silane derivatives (I) and phosphotic monoesters (II) an hydrophilic organic solvent, optionally in admixture with water, is preferably used. The hydrophilic organic solvent can be selected in particular from: aliphatic alcohols having from 1 to 4 carbon atoms, for instance isopropanol or terbutanol; aliphatic glycols having from 2 to 6 carbon atoms, optionally having an etherified hydroxyl, for instance dipropylenglycol or dipropylenglycol-dimethylether; ketones or aliphatic esters having from 3 to 10 carbon atoms, for instance acetone or ethyl acetate.

In case water is present, the weight ratio water/organic solvent is generally from 1:10 to 50:1, preferably from 1:1 to 40:1. In particular, in case of more diluted compositions, such a ratio is preferably from 8:1 to 30:1.

The total concentration of the fluorinated product of formula (I) and (II) present in the composition object of the present invention is generally from 0.5 to 20% by weight, preferably from 1 to 10% by weight. It is also possible to prepare formulations with higher concentrations, but this would damage the stability and/or the dilutability of the formulations themselves. From the application point of view, in order to make the treatment easier and obtain a better uniformity in the distribution of the fluorinated products on the treated substratum, it is advantageous to use diluted compositions, having concentrations comprised between 2 and 5% by weight.

In the compositions object of the present invention, the weight ratio between phosphoric monoester of formula (II) and silane derivative of formula (I) can generally range between 1:30 and 20:1. In case water is present, such a ratio is preferably comprised between 1:5 and 10:1, more preferably between 1:1 and 4:1, while if water is not present it is preferable to operate with ratios comprised between 1:10 and 1:40, more particularly between 1:25 and 1:35.

On the basis of the experimentation carried out by the Applicant, it has been found that the dispersions of the silane derivatives of formula (I), without addition of a phosphoric monoester (II), are very unstable, both in pure hydrophilic organic solvents and in mixtures thereof with water. Moreover, after their application, in order to obtain a good fixing of the fluorinated product on the substrate, it is necessary to carry out a hot treatment in a humidity saturated atmosphere. In order to speed up such fixing it can be suitable to add to the aqueous phase an acid, which however makes the formulation even less stable, favouring the precipitation of curing products.

On the other hand, the application of only the phosphoric monoester of formula (II), even though it leads to a good degree of oil-repellency, does not allow to obtain a sufficient water-repellency degree.

Unexpectedly, the combination of the silane derivatives (I) and of the phosphoric monoesters (II) allows to obtain limpid and stable formulations in the time, which can be easily diluted until the desired concentration is obtained for the application on the material to be treated. After such application, optimal properties both of oil- and water-repellency are obtained, without having to use particular post-treatments and/or the addition of acids in the aqueous phase. Such properties are maintained for a long time, even after washing both in water with detergents and by dry cleaning with organic solvents, in particular chlorinated organic solvents.

Moreover, the application of said formulations allows to maintain unchanged the "coat" proper of untreated materials, a particularly important characteristic in case of materials for which a high softness, such as wool, polyester/cotton, skin, is required.

The preparation of the compositions object of the present invention can be carried out by mixing under stirring the fluorinated products in the hydrophilic organic solvent, until a limpid and not very viscous system is obtained. In case also water is present, it is preferable to use the following method: (a) to mix under stirring the fluorinated products in the hydrophilic organic solvent until a cloudy and viscous mass is obtained; (b) to slowly add water under stirring until a limpid and viscous formulation is obtained; c) to quickly add additional water so as to obtain a formulation having low viscosity. Depending on the kind of the substrate to be treated, the composition can be further diluted with the organic solvent and/or water, so as to make the application thereof easier and uniform.

The compositions object of the present invention can be applied on a wide range of substrates, such as fabrics of natural or artificial fibers, having as such both high hydrophilicity (for instance cotton, viscose, etc.) and low hydrophilicity (for instance wool, polyamides, polyesters, etc.) or also skins, leather and the like.

The total amount of fluorinated products to be applied obtain a satisfactory effect depends of course on the type of treated substrate (composition, surface configuration, etc.). Minimum surface concentrations of between 0.2 and 10 $g/m^2$, preferably between 0.5 and 5 $g/m^2$, are generally sufficient. In any case, depending on specific conditions, it is sufficient for a skilled man to carry out some tests to state the optimal amount to be applied.

The compositions object of the present invention can be applied on the substrate with conventional methods, such as dipping, spray, roll coating, etc. After the application, the excess is removed by dripping, squeezing, rolling, etc., while the water and the solvent are removed according to conventional techniques. In order to speed up drying and to favour the interaction between fluorinated products and the substrate, it is particularly advantageous to carry out a thermal treatment at a temperature higher than 100° C., generally from 100° to 180° C., for a time which can range, for instance from 1 to 30 min, preferably from 2 to 10 min.

Some working examples of the present invention are reported hereinafter, the purpose of which is merely illustrative but not limitative of the scope of the invention itself.

The water- and oil-repellency properties of the various treated substrates have been evaluated according to procedures mentioned hereinafter.

Water-repellency

It is evaluated the absorption, in different and subsequent tests, of various solutions water/isopropanol having ratios by volume comprised from 100/0 to 0/100, as reported in Table 1a according to the following method.

Four drops with a diameter of about 3 mm of the isopropanol/water solution are deposited on a sample of treated substrate having 5×5 cm. The behaviour of the four drops is observed for a time of 30 sec. If for three drops out of four drops no absorption occurs or anyway darkening of the contact surface between material and drop is not observed, one passes to the subsequent solution with higher content of isopropanol. The water-repellency index, in a scale from 0 to 10, corresponds to the value reported in Table 1a relating to the last tested solution that has not given absorption and/or darkening. The greater the index value the greater the water-repellency effect.

Oil-repellency

It is evaluated the absorption, in different and subsequent tests, of various hydrocarbon liquids having surface tension comprised between 31.5 and 19.8 dyne/cm, listed in Table 1b, following what provided for by AATCC Test Method 118-1972.

Four drops with a diameter of about 3 mm of the hydrocarbon liquid are deposited on a sample of treated substance having 5×5 cm. The behaviour of the four drops is observed for a time of 30 sec. If for three drops out of four drops no absorption occurs or anyway darkening of the contact surface between material and drop is not observed, one passes to the subsequent liquid having lower surface tension. The oil-repellency index, in a scale from 1 to 8, corresponds to the value reported in Table 1b relating to the last liquid tested that has not given absorption and/or darkening. The greater the index value the greater the oil-repellency effect.

TABLE 1a

| SOLUTION $H_2O$/i-Pr/OH (vol/vol) | WATER-REPELLENCY INDEX |
| --- | --- |
| 100/0 | 0 |
| 90/10 | 1 |
| 80/20 | 2 |
| 70/30 | 3 |
| 60/40 | 4 |
| 50/50 | 5 |
| 40/60 | 6 |
| 30/70 | 7 |
| 20/80 | 8 |
| 10/90 | 9 |
| 0/100 | 10 |

TABLE 1b

| LIQUID | SURFACE TENSION (dyne/cm) | OIL-REPELLENCY INDEX |
| --- | --- | --- |
| white mineral oil | 31.5 | 1 |
| white mineral oil + n-hexadecane 65/35 v/v | 29.5 | 2 |
| n-hexadecane | 27.3 | 3 |
| n-tetradecane | 26.4 | 4 |
| n-dodecane | 24.7 | 5 |
| n-decane | 23.5 | 6 |
| n-octane | 21.4 | 7 |
| n-heptane | 19.8 | 8 |

EXAMPLE 1

In a glass container, equipped with magnetic stirrer, were introduced:

a mixture consisting in 90% by moles of a phosphoric monoester corresponding to the formula (II) with:

$L'$=—$CH_2(OCH_2CH_2)$—; $\beta$=1; $Z^+$=$H^+$; $R'_f$=Galden® Y chain (formula III), having $\overline{M}_n$=700, $\overline{M}_w/\overline{M}_n$=1.3, m'/n'=20 ($\overline{M}w$ being the average molecular weight by weight); the remaining 10% being formed by a mixture of the corresponding diestar ($\beta$=2) and triestar ($\beta$=3); 2,5 g of a silane derivative corresponding to the formula (I) with: L=—CO—NH—$(CH_2)_3$—; $\alpha$=0; $R_2$=—$C_2H_5$; $R_f$=Galden® Y chain (formula (III)), having $\overline{M}_n$=700, $\overline{M}_w/\overline{M}_n$=1,3, m/n=20.

After addition of 15 g of isopropanol, the mixture (weight ratio phosphoric monoester/silane amide (II)/(I)=3:1) was maintained under stirring for about 30 min until an homogeneous, cloudy mass was obtained. Distilled water was then added dropwise, after the addition of about 25 ml of watar the mixture appeared limpid. At this point further distilled water was quickly added until 100 g of formulation were obtained. The latter, containing 10% by weight of fluorinated products, resulted to be limpid and stable after a storing of over 4 months.

The so obtained formulation was diluted with additional water in 1:1 ratio by weight, so as to obtain the following final composition: 5.0% by weight of fluorinated products, 7.5% by weight of isopropanol, 87.5% by weight of water.

Such formulation was then applied on a polyamide cloth (aramide-viscose), having a basis weight equal to 240 g/m$^2$, according to the following procedure. A cloth sample, 5 cm×5 cm, was dipped in 10 ml of formulation for 30 sec, then dripped for 1 min and put in a stove at 170° C. for 10 min, and then cooled at room temperature. A surface concentration of fluorinated products equal to 5.0 g/m$^2$ was thus obtained. Then the water- and oil-repellency were evaluated according to what described above. The results are reported in Table 2.

EXAMPLE 2

Example 1 was repeated by applying the same formulation on a polyester/cotton cloth having a basis weight equal to 80 g/m$^2$, so a to obtain a surface concentration equal to 1.6 g/m$^2$. The results are reported in Table 2.

EXAMPLE 3

The formulation prepared according to Example 1 was diluted with water in 1:5 ratio by weight, so as to obtain the following final composition: 2.0% by weight of fluorinated products, 3.0% by weight of isopropanol, 95.0% by weight of water. A sample of the polyester/cotton cloth of Example 2, 5 cm×5 cm, was dipped into 10 ml of formulation for 30 sec, then dripped for 1 min and put in stove at 150° C. for 2 min and finally cooled at room temperature. A surface concentration of fluorinated products equal to 0.6 g/m$^2$ was thus obtained. The water- and oil-repellency were reported in Table 2.

EXAMPLE 4

In order to evaluate the resistance of the treatment to washing in water with surfactants, a sample of polyamide, treated as described in Example 1, was dipped into 250 ml of a 5% by weight in water solution of Dixan® (the Dixan contains anionic (alkylbenzensulfonates and fatty carboxylated acids) and non ionic surfactants (ethoxylated alcohols), with a neutral pH, for 30 min at 50° C. under stirring. After dripping, the sample was dipped into 250 ml of water, under stirring at room temperature for 15 min to eliminate the surfactants, and then dripped and dried on a plate at 100° C. for 2 min. After treatment in stove at 170° C. for 10 min and subsequent cooling at room temperature, the water- and oil-repellency were evaluated on the sample. The results are reported in Table 2.

EXAMPLE 5

Example 4 was repeated by using a sample of polyester/cotton treated according to Example 2. The results are reported in Table 2.

EXAMPLE 6

Example 4 was repeated by using a sample of the same cloth of polyester/cotton treated according to Example 3. The results are reported in Table 2.

applying the same 5% by weight formulation on a sample of the same polyamide cloth. The application and the subsequent washing with surfactants were carried out according to what described in Example 4. The results are reported in Table 2.

EXAMPLE 10

Example 9 was repeated by using a sample of the same polyester/cotton cloth treated according to Example 8. The results are reported in table 2.

TABLE 2

| EX. | RATIO (II)/(I) (w/w) | CLOTH | FLUORINATED PRODUCTS CONC. | | WASHING | WATER-REPELLENCY | OIL-REPELLENCY |
|---|---|---|---|---|---|---|---|
| | | | in formulat. (% by wt) | on cloth (g/m$^2$) | | | |
| 1 | 3:1 | polyamide | 5 | 5 | no | 2 | 6 |
| 2 | | polyester/cotton | 5 | 1.6 | no | 2 | 6 |
| 3 | | polyester/cotton | 2 | 0.6 | no | 2 | 6 |
| 4 | | polyamide | 5 | 5 | yes | 2 | 6 |
| 5 | | polyester/cotton | 5 | 1.6 | yes | 2 | 6 |
| 6 | | polyester/cotton | 2 | 0.6 | yes | 2 | 5 |
| 7 | 2:1 | polyamide | 5 | 5 | no | 2 | 6 |
| 8 | | polyester/cotton | 5 | 1.6 | no | 2 | 6 |
| 9 | | polyamide | 5 | 5 | yes | 2 | 6 |
| 10 | | polyester/cotton | 5 | 1.6 | yes | 1 | 5 |

EXAMPLE 7

In a glass container, equipped with magnetic stirrer, were introduced 6.6 g of phosphoric monoester (II) and 3.3 g of silane derivative (I) of Example 1. After addition of 20 g of isopropanol, the mixture (weight ratio phosphoric monoester/silane amide (II)/(I)=2:1) was maintained under stirring for about 30 min until an homogeneous, cloudy mass was obtained. Distilled water was then added dropwise: after the addition of 30 ml of water the mixture appeared limpid. At this point further 40 ml of distilled water were quickly added so as to obtain a formulation containing 10% by weight of fluorinated products, which resulted to be limpid and stable after store of over 3 months.

The so obtained formulation was diluted with additional water in 1:1 ratio by weight, so as to obtain the following final composition: 5.0% by weight of fluorinated products, 10.0% by weight of isopropanol, 85.0% by weight of water.

Such formulation was then applied, according to the procedure described in Example 1, on a sample 5 cm×5 cm of the same polyamide cloth of Example 1, so as to obtain a surface concentration of fluorinated products equal to 5.0 g/m$^2$. The results of water- and oil-repellency indexes are reported in Table 2.

EXAMPLE 8

Example 7 was repeated by applying the same formulation on a sample of the same polyester/cotton cloth of Example 2, so as to obtain a surface concentration of fluorinated products equal to 1.6 g/m$^2$. The water- and oil-repellency values are reported in Table 2.

EXAMPLE 9

In order to evaluate the resistance of the treatment to water washing with surfactants, Example 7 was repeated by

EXAMPLE 11

Following the method described in Example =b 1,a formulation was prepared formed by: 10.0% by weight of the fluorinated products of Example 1, i.e. phosphoric monoester (II) and silane derivative (I) in 3:1 ratio by weight; 22.0% by weight of dipropylenglycol-dimethyl-ether; 68.0% by weight of water. The formulation appeared limpid, stable and easily dilutable with water.

The so obtained formulation was diluted with additional water in 1:5 ratio by weight, so as to obtain an overall concentration of fluorinated products equal to 2.0% by weight.

Such formulation was then applied on a sample 5 cm×5 cm of the same polyester/cotton cloth of Example 2 by using the method of ex 3, so as to obtain a surface concentration of fluorinated products equal to 0.6 g/m$^2$. The valaues of the water- and oil-repellency indexes are reported in Table 3.

EXAMPLE 12

In order to evaluate the resistance of the treatment to water washing with surfactants, a sample of polyester/cotton treated according to what described in Example 11 was washed in water with surfactants (of Ex. 4) following the procedure described in Example 4. The results are reported in Table 3.

EXAMPLE 13

In order to evaluate the resistance of the treatment to dry cleaning with chlorinated organic solvents, a sample of polyester/cotton treated according to Example 11 was dipped in a container containing 100 ml of trichloroethylene at 80° C. and kept under agitation for 10 min. After evaporation of the solvent and cooling at room temperature, the water- and oil-repellency indexes were evaluated on the sample. The results are reported in Table 3.

EXAMPLES 14–15 (COMPARATIVE)

Examples 11 and 13 were repeated by applying on a sample of the same polyester/cotton cloth a formulation with an aqueous basis containing 1% by weight of fluoropolyacrylates, called Scotchguard® FC-3569 (5% by weight of surfactants, 25% by weight of dry). The surface concentration on the cloth of fluorinated product was equal to 0.3 $g/m^2$. The water- and oil-repellency were reported in Table 3.

TABLE 3

| EX. | APPLIED PRODUCT | WASHING | WATER-REPELLENCY | Oil-REPELLENCY |
|---|---|---|---|---|
| 11 | phosphoric monoester + | no | 2 | 6 |
| 12 | silane derivative | with surfactants | 2 | 5 |
| 13 | | dry | 1 | 5 |
| 14* | Scotchguard ® | no | 4 | 5 |
| 15* | FC-3569 | dry | 0 | 0 |

*comparative

EXAMPLES 16–19 (COMPARATIVE)

In a glass container, equipped with a magnetic stirrer, 5.0 g of phosphoric monoester (II) of Example 1 were diluted in 25 g of isopropanol and 70 g of $H_2O$. Such a mixture was utilized to treat polyamide and polyester/cotton fabrics according to Examples 1–2 and 4–5. The water- and oil-repellency values are reported in Table 4.

EXAMPLES 20–23 (COMPARATIVE)

In a glass container, equipped with magnetic stirrer, 5.0 g of the same silane derivative (I) of Example 1 were diluted into 95 g of isopropanol. Such a mixture, which gave instability problems after about one month from the preparation (precipitation of the fluorinated product), was utilized to treat the polyamide and polyester/cotton fabrics of Examples 1–2 with the following procedure.

A sample cloth, 5 cm×5 cm was dipped into 10 ml of formulation for 30 sec, then dripped for 1 min and put in stove full of steam at 170° C. for 10 min, and finally cooled at room temperature. A surface concentration of fluorinated products equal to 5.0 $g/cm^2$ was thus obtained. The water- and oil-repellency indexes were then evaluated according to what described above. The results are reported in Table 4.

TABLE 4

| | | | FLUORINATED PRODUCT CONC. | | | | |
|---|---|---|---|---|---|---|---|
| EX.(*) | APPLIED PRODUCT | CLOTH | in the formul. (% by wt) | on the cloth ($g/m^2$) | WASHING | WATER-REPELLENCY | OIL-REPELLENCY |
| 16 | phosphoric | polyamide | 5 | 5 | no | 0 | 6 |
| 17 | monoester | polyester/cotton | 5 | 1.6 | no | 0 | 5 |
| 18 | | polyamide | 5 | 5 | yes | 0 | 2 |
| 19 | | polyester/cotton | 5 | 1.6 | yes | 0 | 1 |
| 20 | silane | polyamide | 5 | 5 | no | 2 | 3 |
| 21 | derivative | polyester/cotton | 5 | 1.6 | no | 2 | 4 |
| 22 | | polyamide | 5 | 5 | yes | 2 | 4 |
| 23 | | polyester/cotton | 5 | 1.6 | yes | 2 | 4 |
| 24 | Galden ® Y | polyamide | 5 | 5 | no | 0 | 0 |
| 25 | | polyester/cotton | 5 | 1.6 | no | 0 | 0 |

(*)comparative

EXAMPLES 24–25 (COMPARATIVE)

Examples 1–2 were repeated by using, instead of the formulation comprising the silane derivative and the phosphotic monoester, a 5.0% by weight solution of trichlorotrifluoroethane of an unfunctionalized Galden® Y, corresponding to the formula (III) with $CF_3$ terminal, having $M_n$=1500, obtained by fractional distillation of the corresponding commercial product. The water- and oil-repellency values are reported in Table 4.

EXAMPLE 26

The formulation prepared according to Example 11, diluted 1:5 with water so as to have a concentration of fluorinated products equal to 2.0% by weight, was used to treat a sample of woollen cloth, having a basis weight equal to 280 g/m² and 5 cm×5 cm, according to the following method. The sample was dipped into 10 ml of formulation for 30 sec, then dripped for 1 min, put in stove at 170° C. for 10 min; after cooling at room temperature, on the sample, which showed a concentration of fluorinated products equal to 2.0 g/m², the water- and oil-repellency indexes were evaluated. The results are reported in Table 5.

EXAMPLE 27

In order to evaluate the resistance of the treatment to water washing with surfactants, a woollen sample treated according to Example 26 was washed in water with surfactants following the procedure described in Example 4. The water- and oil-repellency values are reported in Table 5.

EXAMPLES 28–29 (COMPARATIVE)

In a glass container, equipped with magnetic stirrer, were introduced 2.0 g of the same silane derivative (I) of Example 1 and 20.0 g of glacial acetic acid. The mixture was stirred for about 1 min up to a complete dissolution of the silane derivative. 2.0 g of distilled water and 76.0 g of isopropanol were then added. The formulation resulted unstable, showing precipitation of the fluorinated product after about 1 hour from the preparation, and dilutable with isopropanol but not with water. The composition of the formulation was the following: 2.0% by weight of silane derivative; 20% by weight of glacial acetic acid; 2.0% by weight of water; 76.0% by weight of isopropanol.

Such formulation was utilized to treat a woollen cloth according to Examples 26–27. The water- and oil-repellency are reported in Table 5.

EXAMPLES 30–31 (COMPARATIVE)

In a glass container, equipped with magnetic stirrer, 2.0 g of the same silane (I) derivative of Example 1 were diluted into 98.0 g of isopropanol. Such mixture was utilized for treating a sample of the same woollen cloth of Example 26 according to the procedure described in Examples 20–23. The water- and oil-repellency values are reported in Table 5.

The so obtained formulation was then applied on a cotton cloth, having a basis weight equal to 160 g/m², according to the procedure described in Example 1, so as to obtain a surface concentration of fluorinated products equal to 0.9 g/m². The water- and oil-repellency indexes were then evaluated according to what described above. The results are reported in Table 6.

EXAMPLE 33

In order to evaluate the resistance of the treatment to water washing with surfactants, a sample of cotton treated according to what described in Example 32 was washed in water with surfactants following the procedure described in Example 4. The water- and oil-repellency values are reported in Table 6.

EXAMPLE 34

A 5 cm×5 cm sample of skin type soft leather having a basis weight equal to 620 g/m² was treated according to the following procedure with a formulation prepared according to Example 11, diluted 1:5 with water so as to have a concentration of fluorinated products equal to 2.0% by weight. The sample was dipped into 10 ml of the formulation for 30 sec, then dripped for 1 min and put in stove at 40° C. for 60 min. After cooling at room temperature, on the sample, having a surface concentration of fluorinated products equal to 0,3 g/m² the water- and oil-repellency indexes were evaluated according to what described above. The results are reported in Table 6.

EXAMPLE 35

A 5 cm×5 cm sample of "nabuk" type skin, i.e., a specific velvet kid leather, having a basis weight equal to 980 g/m² was treated as described in Example 34 with the same formulation of Example 11 (2.0% by eight of fluorinated products). The water- and oil-repellency indexes determined on the so treated sample, having a surface concentration of fluorinated products equal to 0.5 g/m², are reported in Table 6.

TABLE 5

| EX. | APPLIED PRODUCT | WASHING | WATER-REPELLENCY | OIL-REPELLENCY |
|---|---|---|---|---|
| 26 | phosphoric monoester + | no | 5 | 6 |
| 27 | siloxane derivative | yes | 5 | 3 |
| 28* | silane derivative + | no | 3 | 6 |
| 29* | acetic acid | yes | 3 | 3 |
| 30* | siloxane derivative | no | 2 | 0 |
| 31* |  | yes | 1 | 0 |

*comparative

EXAMPLE 32

In a glass container, equipped with magnetic stirrer, 0.067 g of phosphoric monoester (II) and 1.933 g of the silane derivative (I) of Example 1 were introduced. After addition of 8 g of isopropanol, the mixture (weight ratio phosphoric monoester/silane amide (II)/(I)=1:29) was kept under stirring until a limpid formulation, dilutable with isopropylic alcohol was obtained, containing 20% by weight of fluorinated products. The formulation was then diluted in ratio 1:10 by weight with isopropanol, so as to obtain a concentration equal to 2.0% by weight.

TABLE 6

| EX. | TREATED MATERIAL | FLUORINATED PRODUCTS CONCENTRATION | | WASHING | WATER-REPELL. | OIL-REPELL. |
|---|---|---|---|---|---|---|
| | | formul. (% by wt) | substratum (g/m$^2$) | | | |
| 32 | cotton | 2 | 0.9 | no | 4 | 5 |
| 33 | | | | yes | 3 | 3 |
| 34 | skin "soft leather" | 2 | 0.3 | no | 2 | 2 |
| 35 | skin "nabuk" | 2 | 0.5 | no | 1 | 4 |

Clearly, the invention is directed to imparting oil- and water-repellency to substrates used in making garments. The term "substrate" is non-limiting and includes single-fibers of synthetic and natural original, woven and non-woven webs, swatches, bolts, etc. The term "garment", for purposes of this application is not a term of limitation, but includes, for instance, carpets, rugs, upholstery, clothes, woven and non-woven materials, etc.

Accordingly, the invention is understood fully from the following description of the specific embodiments of the invention which have been provided for illustration only and not to limit the scope of the invention as defined in the annexed claims.

We claim:

1. Process for imparting oil- and water-repellency to textile fibers, skin, leather substrates, which comprises applying on said substrates a composition comprising a functionalized (per)fluoropolyoxyalkylene with silane groups having the formula:

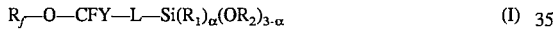

$$R_f\text{—}O\text{—}CFY\text{—}L\text{—}Si(R_1)_\alpha(OR_2)_{3-\alpha} \quad (I)$$

wherein:

$R_f$ is a (per)fluoropolyoxyalkylene chain; Y is —F or —CF$_3$; L is a divalent organic group; $R_1$ and $R_2$, equal to or different from each other, are selected from $C_1$–$C_6$ alkyls, optionally containing one or more ether bridges, $C_6$–$C_{10}$ aryls, alkylaryls or arylalkyls $C_7$–$C_{12}$; $\alpha$ is an integer from 0 to 2;

and a phosphoric monoester having the formula:

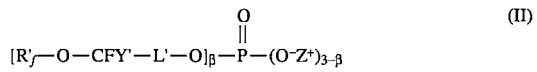

$$[R'_f\text{—}O\text{—}CFY'\text{—}L'\text{—}O]_\beta\text{—}\overset{O}{\underset{\|}{P}}\text{—}(O^-Z^+)_{3-\beta} \quad (II)$$

wherein:

$R'_f$ is a (per)fluoropolyoxyalkylene chain; Y' is —F or —CF$_3$; L' is a divalent organic group; $\beta$=1, $Z^+$ is selected from H$^+$ or M$^+$ wherein M is an alkaline metal or N(R$_3$)$_4^+$ wherein the R$_3$ groups, equal to or different from each other, are H or C$_1$–C$_6$ alkyls.

2. Process according to claim 1, wherein in formula (I) $\alpha$ is 0 or 1.

3. Process according to claim 1, wherein in the formula (I) the L group is selected from:

(a) —CH$_2$—(OCH$_2$CHR$_4$)$_n$—, wherein: n is an integer from 0 to 3; R$_4$ is —H or —CH$_3$; or (b) —CO—NR$_5$R$_6$—, wherein R$_5$ is H or a C$_1$–C$_4$ alkyl; R$_6$ is a C$_1$–C$_8$ alkylene, or a —(CH$_2$)$_p$NH(CH$_2$)$_q$— group wherein p, q are integers from 1 to 4;

and L' group is selected from:

(a') —CH$_2$—(OCH$_2$CHR$_7$)$_n$—, wherein: n is an integer from 0 to 3;, R$_7$ is —H or —CH$_3$; or (b') —CO—NR$_8$R$_9$—, wherein R$_8$ is H or a C$_1$–C$_4$ alkyl; R$_9$ is a C$_1$–C$_8$ alkylene.

4. Process according to claim 1, wherein the (per)fluoropolyoxyalkylenic chains R$_f$ and R'$_f$, equal to or different from each other, have a number average molecular weight $\overline{M}_n$ from 350 to 3,000, and are formed by one or more repetitive units, statistically distributed along the chain, selected from:

(C$_3$F$_6$O); (C$_2$F$_4$O); (CFYO), wherein Y is —F or —CF$_3$; or (CXZ—CF$_2$CF$_2$O), wherein X and Z, equal or different from each other, are F, Cl or H.

5. Process according to claim 1, wherein the silane derivative (I) and the phosphoric monoester (II) are dispersed in an hydrophilic organic solvent, optionally in admixture with water.

6. Process according to claim 5, wherein the hydrophilic organic solvent is selected from the group consisting of aliphatic alcohols having from 1 to 4 carbon atoms; aliphatic glycols having from 2 to 6 carbon atoms, having optionally an etherified hydroxyl; ketones and aliphatic esters having from 3 to 10 carbon atoms.

7. Process according to claim 5, wherein the hydrophilic organic solvent is in admixture with water, the weight ratio water/organic solvent being comprised between 1:10 and 50:1.

8. Process according to claim 1, wherein the total concentration of the fluorinated products of formula (I) and (II) in the composition is comprised between 0.5 and 20% by weight.

9. Process according to claim 8, wherein the total concentration of the fluorinated products of formula (I) and (II) in the composition is comprised between 2 and 5% by weight.

10. Process according to claim 1, wherein in the composition the weight ratio between phosphoric monoester (II) and silane derivative (I) is comprised between 1:30 and 20:1.

11. Process according to claim 10, wherein in the composition water is present and the weight ratio between phosphoric monoester (II) and silane derivative (I) is comprised between 1:5 and 10:1.

12. Process according to claim 10, wherein in the composition water is not present and the weight ratio between phosphoric monoester (II) and silane derivative (I) is comprised between 1:10 and 1:40.

13. Process according to claim 1, wherein the surface concentration of fluorinated products in the treated substrate is comprised between 0.2 and 10 g/m$^2$.

14. Process according to claim 1, wherein after the application of the composition the material is submitted to thermal treatment at a temperature higher than 100° C.

15. A composition comprising a substrate and a functionalized (per)fluoropolyoxyalkylene with silane groups of the formula I:

$$R_f-O-CFY-L-Si(R_1)_\alpha(OR_2)_{3-\alpha} \quad (I)$$

wherein:

$R_f$ is a (per)fluoropolyoxyalkylene chain; Y is —F or —$CF_3$; L is a divalent organic group; $R_1$ and $R_2$, equal to or different from each other, are selected from $C_1$–$C_6$ alkyls, optionally containing one or more ether bridges, $C_6$–$C_{10}$ aryls, alkylaryls or arylalkyls $C_7$–$C_{12}$; $\alpha$ is an integer from 0 to 2;

and a phosphoric monoester having the formula II:

$$[R'_f-O-CFY'-L'-O]_\beta P(O^-Z^+)_{3-\beta} \quad (II)$$

wherein:

$R'_f$ is a (per)fluoropolyoxyalkylene chain; Y' is —F or —$CF_3$; L' is a divalent organic group; $\beta=1$, $Z^+$ is selected from the group consisting of $H^+$ and $M^+$ wherein M is an alkaline metal or $N(R_3)_4^+$ wherein the $R_3$ groups, equal to or different from each other, are H or $C_1$–$C_6$ alkyls applied to the substrate.

* * * * *